(12) United States Patent
Chiarulli et al.

(10) Patent No.: US 9,596,497 B2
(45) Date of Patent: *Mar. 14, 2017

(54) RECIPIENT SPECIFIC LISTS FOR DISTRIBUTION OF MEDIA CONTENT

(71) Applicant: Disney Enterprises, Inc., Burbank, CA (US)

(72) Inventors: Michael V. Chiarulli, Summit, NJ (US); Todd Christiansen, Garden City, NY (US); David A. Dreispan, Cedar Knolls, NJ (US); Joseph P. Kenny, Floral Park, NY (US); Jerry Rapella, Belford, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/865,354

(22) Filed: Apr. 18, 2013

(65) Prior Publication Data

US 2014/0317666 A1    Oct. 23, 2014

(51) Int. Cl.
*H04N 7/173* (2011.01)
*H04N 21/266* (2011.01)
(Continued)

(52) U.S. Cl.
CPC ...... *H04N 21/26613* (2013.01); *H04H 60/06* (2013.01); *H04N 21/235* (2013.01);
(Continued)

(58) Field of Classification Search
None
See application file for complete search history.

(56) References Cited

U.S. PATENT DOCUMENTS 7,020,888 B2   3/2006 Reynolds
8,561,102 B1 * 10/2013 Mack et al. ............ 725/25
(Continued)

FOREIGN PATENT DOCUMENTS

CN   102948159 A   2/2013
WO   WO 02/43396 A2   5/2002

OTHER PUBLICATIONS

"1st Report of EBU / SMPTE Task Force for Harmonized Standards for the Exchange of Television Program Material as Bit Streams", EBU Review—Technical, European Broadcasting Union. Brussels, BE, No. 272, Jun. 21, 1997, pp. 1-73, XP000720137, ISSN: 0251-0936.

(Continued)

*Primary Examiner* — Junior Mendoza
(74) *Attorney, Agent, or Firm* — Farjami & Farjami LLP (57) ABSTRACT

There is provided a system and method of recipient specific lists for distribution of media content. The method comprises obtaining at least one unique identifier (UID), wherein the at least one UID identifies a content, and wherein the at least one UID identifies a recipient location and presentation data, generating a recipient specific list (RSL) using the at least one UID, wherein the RSL includes at least one content identifier, and wherein the RSL includes at least one recipient identifier, and transmitting the RSL to an encoded content transport stream creator for creation of an encoded content transport stream. The at least one recipient identifier may correspond to a broadcast affiliate television recipient or a multichannel video programming distributor. Additionally, the RSL may contain primary content, such as television programs, movies, commercials, and promotional programming, as well as secondary content, such as content overlays, program schedules, and triggers.

18 Claims, 4 Drawing Sheets

(51) Int. Cl.
*H04H 60/06* (2008.01)
*H04N 21/262* (2011.01)
*H04N 21/81* (2011.01)
*H04N 21/84* (2011.01)
*H04N 21/235* (2011.01)
*H04H 60/73* (2008.01)

(52) U.S. Cl.
CPC ... *H04N 21/26266* (2013.01); *H04N 21/8126* (2013.01); *H04N 21/84* (2013.01); *H04H 60/73* (2013.01)

(56) References Cited

U.S. PATENT DOCUMENTS

| | | |
|---|---|---|
| 2007/0261072 A1 | 11/2007 | Boulet |
| 2008/0243756 A1* | 10/2008 | Moon et al. ............... 707/1 |
| 2009/0106082 A1* | 4/2009 | Senti et al. ............... 705/10 |
| 2009/0172106 A1 | 7/2009 | Li |
| 2010/0138852 A1* | 6/2010 | Hirsch et al. ............... 725/13 |
| 2010/0138870 A1* | 6/2010 | Anthru et al. ............... 725/54 |
| 2010/0178030 A1 | 7/2010 | Colby |
| 2011/0295978 A1* | 12/2011 | Pazos et al. ............... 709/219 |
| 2012/0331168 A1* | 12/2012 | Chen ............... H04L 67/1097 709/231 |
| 2014/0181263 A1* | 6/2014 | Chiarulli et al. ............... 709/219 |
| 2015/0007244 A1* | 1/2015 | Colby ............... H04N 5/782 725/116 |

OTHER PUBLICATIONS

"Content Metadata and Authorization Exchange Between Content Providers and Service Providers", IP.com Journal, IP.com Inc., West Henrietta, NY, US, May 17, 2011, XP013161483, ISSN: 1533-0001.

* cited by examiner

RECIPIENT SPECIFIC LISTS FOR DISTRIBUTION OF MEDIA CONTENT

BACKGROUND

Television programs, live sports, and other media content are delivered to consumers from broadcast and cable networks through broadcast affiliate and multichannel video programming distributor (MVPD) endpoints. The broadcast and cable networks choose the various versions of the media content to be delivered to the affiliate and/or MVPD based on time zones, market clearances, regionalization, or other criteria. The broadcast and cable networks are required to choose transport paths to ensure the media content arrives concurrently and efficiently. Therefore, the broadcast and cable networks must process a wide variety of data, ranging from regional commercial scheduling, time zone delays, sport clearances, and transport path health, to name a few, before the media content is delivered to affiliates or MVPDs.

Traditionally, broadcast automation systems rely on the output of a traffic system to provide information necessary to generate program playlists. These program playlists are typically translated into the broadcast automation system's proprietary playlist file format, and then loaded into the broadcast automation system to generate the respective content feed for the affiliate or MVPD. However, this is reliant on manual processes and creates generalized content feeds, which must later be matched to correct affiliate or MVPD recipients. Thus, specific changes to content feeds require continual adjustment to affiliate and MVPD endpoints or require continual adjustments in order for affiliate and MVPD end points to receive these feeds.

SUMMARY

The present disclosure is directed to recipient specific lists for distribution of media content, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
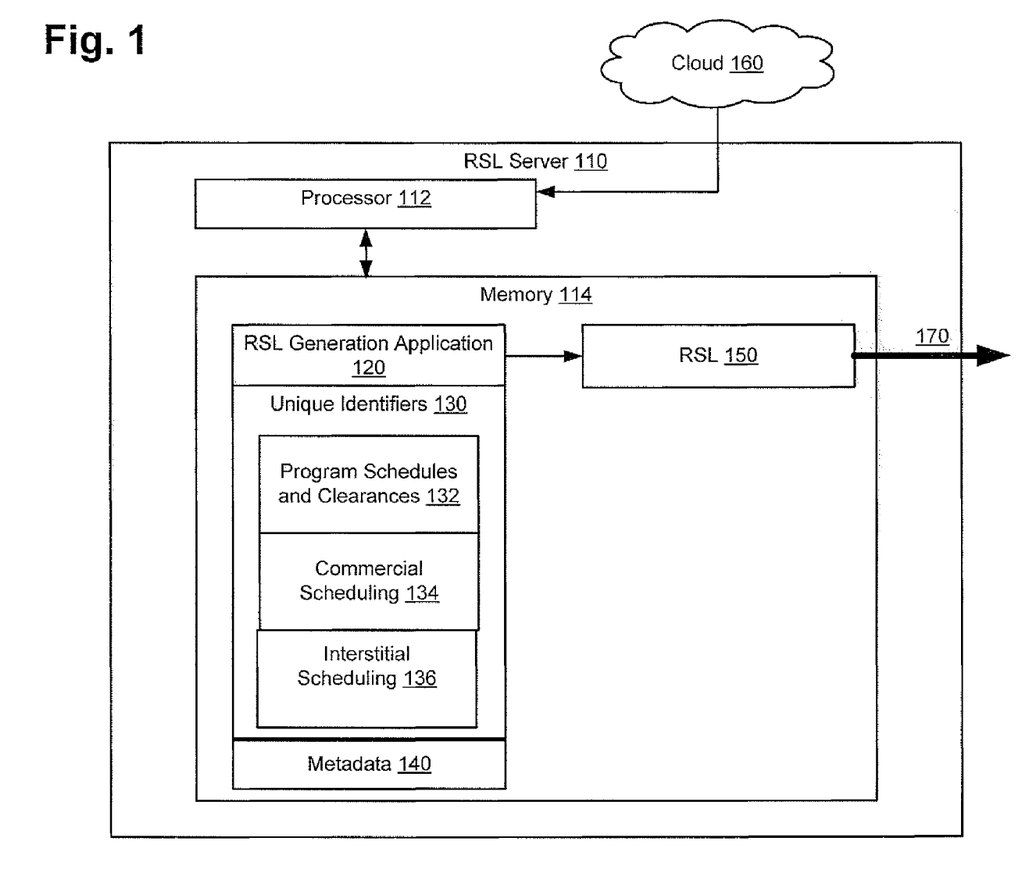
FIG. 1 shows a diagram of one exemplary implementation of a system for generating a recipient specific list for distribution of media content.

FIG. 1 shows a diagram of one exemplary implementation of a system for generating a recipient specific list (RSL) for distribution of media content. As shown in FIG. 1, RSL server 110 includes processor 112 and memory 114 storing RSL generation application 120, unique identifiers 130 including program schedules and clearances 132 and commercial scheduling 134, interstitial scheduling 136, metadata 140, and RSL 150 created by RSL generation application 120. Also shown in FIG. 1 are cloud 160 and RSL transmission and processing 170.

RSL server 110 illustrates a simplified system for generating, publishing, and the transmission of an RSL. Thus, alternative implementations may support multiple systems or servers for balancing and/or reduced latency. Furthermore, as used herein, a processor, such as processor 112, may refer to a single processor or a collection of more than one processor, e.g. microprocessor or a hardware processor. Similarly, memory 114 may refer to a single memory or a collection of more than one memory, such as a non-transitory memory or computer storage.

Unique identifiers 130 may contain program schedules and clearances 132, commercial scheduling 134, and interstitial scheduling 136. Each unique identifier contained in unique identifiers 130 may identify a media content by scheduling and destination requirements. Thus, program schedules 132 may correspond to unique identifiers 130 identifying programming media content, such as television, movie, audio programming, or any other content, by time schedules of programming media content, such as a regional time schedule for a broadcast channels media content, a national channel schedule for a national movie channel, a pay-per-view schedule of a pay-per-view channel, or other scheduling information corresponding to programming media content. Commercial scheduling 134 may correspond to unique identifiers identifying all forms of commercial media content, or other metadata corresponding to commercial media content. Similarly, interstitial scheduling 136 may correspond to unique identifiers identifying all forms of interstitial media content, or other metadata corresponding to interstitial media content. Thus, unique identifiers 130 may collectively contain unique identifiers identifying a media content, as well as additional identification data related to creation and distribution of RSL 150, such as destination points for RSL 150, priority data to determine the priority of utilizing/playing RSL 150, a name or location of an affiliate that receives the content included in RSL 150, a time to play the content from RSL 150, a name of RSL 150 and/or content included in RSL 150, contents of RSL 150, or other data corresponding to RSL 150 and/or content included in RSL 150.

According to the implementation of FIG. 1, processor 112 may process information from cloud 160 and store it in memory 114 as metadata 140. Cloud 160 may correspond to a content cloud containing media content, such as television media content, movie media content, recorded live media content, sports media content, news media content, music media content, or other media content. Processor 112 may receive additional metadata corresponding to content from cloud 160, such as platform quality data, content title data, rating data, and reconciliation keys and store it in memory 114 as metadata 140. Metadata 140 may further contain data from cloud 160 related to the media content and/or encoded content transport stream, such as an interrupt command to stop another encoded content transport stream, a name of the encoded content transport stream, contents of the encoded content transport stream, or other metadata corresponding to the media content and/or encoded content transport stream.

Processor 112 may access memory 114 to execute RSL generation application 120. Processor 112 may execute RSL generation application 120 to obtain and process data from unique identifiers 130 and metadata 140. After processor 112 receives data from unique identifiers 130, such as content identifiers contained in program schedules and clearances 132, commercial scheduling 134, and/or interstitial scheduling 136 and recipient identifiers, RSL generation application 120 may generate a recipient specific list (RSL) using the unique identifiers. Next, processor 112 may further include additional metadata from unique identifiers 130 and/or metadata 140. After, processor 112 creates RSL 150, processor may then transmit RSL 150 for further processing and creation of an encoded content transport stream as shown by RSL transmission and processing 170.

Figure 2:
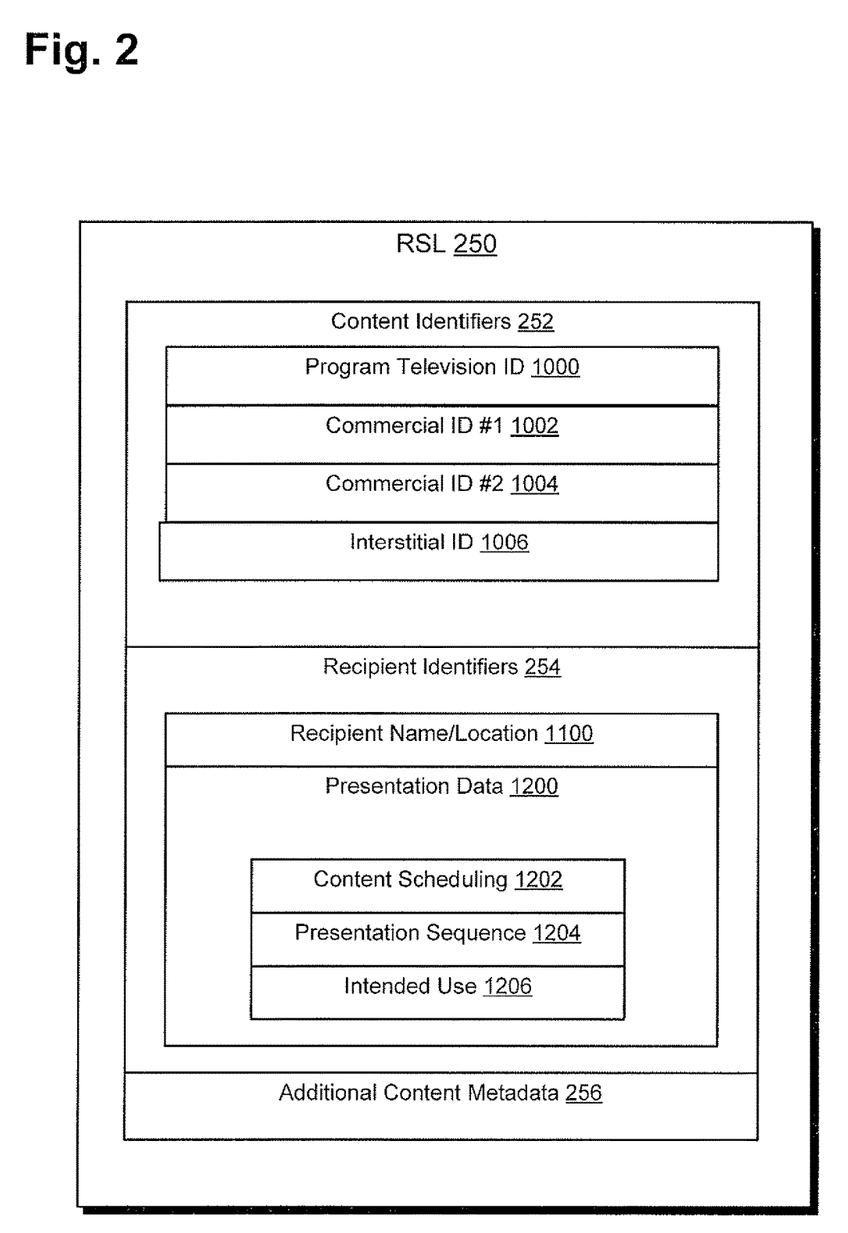
FIG. 2 presents a recipient specific list and included data for distribution of media content.

Moving to FIG. 2, FIG. 2 presents a typical recipient specific list and included data for distribution of media content. FIG. 2 shows RSL 250 having content identifiers 252, recipient identifiers 254, and additional content metadata 256. Content identifiers 252 are shown with program television ID 1000, commercial ID #1 1002, and commercial ID #2 1004, and interstitial ID 1006. Recipient identifiers 254 contains recipient name/location 1100 and presentation data 1200 having content scheduling 1202, presentation sequence 1204, and intended use 1206. While RSL 250 is shown with the above data, it is understood that RSL 250 is shown as a data structure by way of example, and RSL 250 may include more or less data as desired.

RSL 250 presents an exemplary data structure containing identification data to identify at least content and a recipient location for an encoded content transport stream. RSL 250 contains content identifiers 252, recipient identifiers 254, and additional content metadata 256. Content identifiers 252 may correspond to identifiers uniquely identifying media content. Content identifiers 252 may correspond to identification data from a unique identifier. For example, as unique identifiers may identify a media content by scheduling and destination requirements, content identifiers 252 may thus contain identification data for retrieval of the media content, such as a location, name, and/or other identifying information. In one implementation, content identifiers 252 may include identification of media content in a cloud, such as television media content, movie media content, recorded live media content, sports media content, news media content, music media content, or other media content. However, content identifiers 252 may also include identifying data for media content located in databases, remote or local servers, or other data storage locations.

Program television ID 1000 may include identification data corresponding to a television media content, such as a broadcast television program. In other implementations, program television ID 1000 may also identify other types of content including but not limited to movie, music video, or audio programming. Commercial ID #1 1002 and commercial ID #2 1004 may correspond to identification data for commercial media content, such as commercial advertisements by regional advertising, national advertising, or other advertising campaigns. Similarly, interstitial ID 1006 may correspond to identification data for interstitial media content. Thus, RSL 250 contains content identifiers 252 including program television ID 1000 pointing to a broadcast television media content, commercial ID #1 1002 and commercial ID #2 1004 pointing to two commercial media contents, and interstitial ID 1006 pointing to interstitial media content. Using content identifiers 252 of RSL 250, an RSL processing engine may locate and retrieve the three media contents.

RSL 250 is further shown with recipient identifiers 254. Recipient identifiers 254 contains recipient name/location 1100 and presentation data 1200 having content scheduling 1202, presentation sequence 1204, and intended user 1206. Recipient identifiers 254 may contain identification data from unique identifiers that enables identification of an end recipient for an encoded content transport stream created using RSL 250. As unique identifiers may identify a media content by scheduling and destination requirements, recipient identifiers 254 may contain identification data for a recipient location, name, and/or scheduling requirements of the recipient.

Recipient name/location 1100 of recipient identifiers 254 may include identification data corresponding to broadcast affiliate and multichannel video programming distributor (MVPD) or other endpoints for an encoded media content stream. For example, the recipient may correspond to a local broadcast television affiliate endpoint for distribution of a media content, such as a broadcast television episode. Thus, recipient name/location 1100 may correspond to name, location, distribution path, endpoint location, or other identification data embedded in an encoded content transport streams created from RSL 250 and enabling distribution of the encoded content transport stream.

Recipient identifiers 254 further contains presentation data 1200 having content scheduling 1202, presentation sequence 1204, and intended use 1206. Presentation data 1200 may correspond to data to be embedded within an encoded content transport stream for use with a presentation of media content. Presentation data 1200 enables the recipient endpoint to correctly schedule and present the media content. Content scheduling 1202 of presentation data 1200 may correspond to regional time schedule for a broadcast channels media content, a national channel schedule for a national movie channel, a pay-per-view schedule of a pay-per-view channel, commercial and/or interstitial scheduling requirements for regional and/or national advertising, and/or other scheduling information corresponding to programming media content designated by content identifiers 252.

Presentation sequence 1204 of recipient identifiers 254 may correspond to data enabling proper presentation of media content identified by RSL 250. For example, presentation sequence 1204 may correspond to data to be embedded in an encoded content transport stream that determines a play time, sequence of playing of program television ID 1000, commercial ID #1 1002, commercial ID #2 1004, and interstitial ID 1006 and/or a time of arrival at the affiliate or MVPD endpoint for the encoded content transport stream. Presentation data 1200 further contains intended use including data designating a category of use of the media content, such as a television network broadcast, video on demand, advance preview, protection stream, or other intended use.

RSL 250 further contains additional content metadata 256. Additional content metadata 256 may correspond to prioritization data of the encoded content transport stream, platform quality data, RSL identification data, content title data, V-Chip data or Nielsen data, and reconciliation keys. Additional content metadata 256 may contain further metadata as necessary for creation and/or transmission of the encoded content transport stream as well as by the affiliate endpoint.

Figure 3:
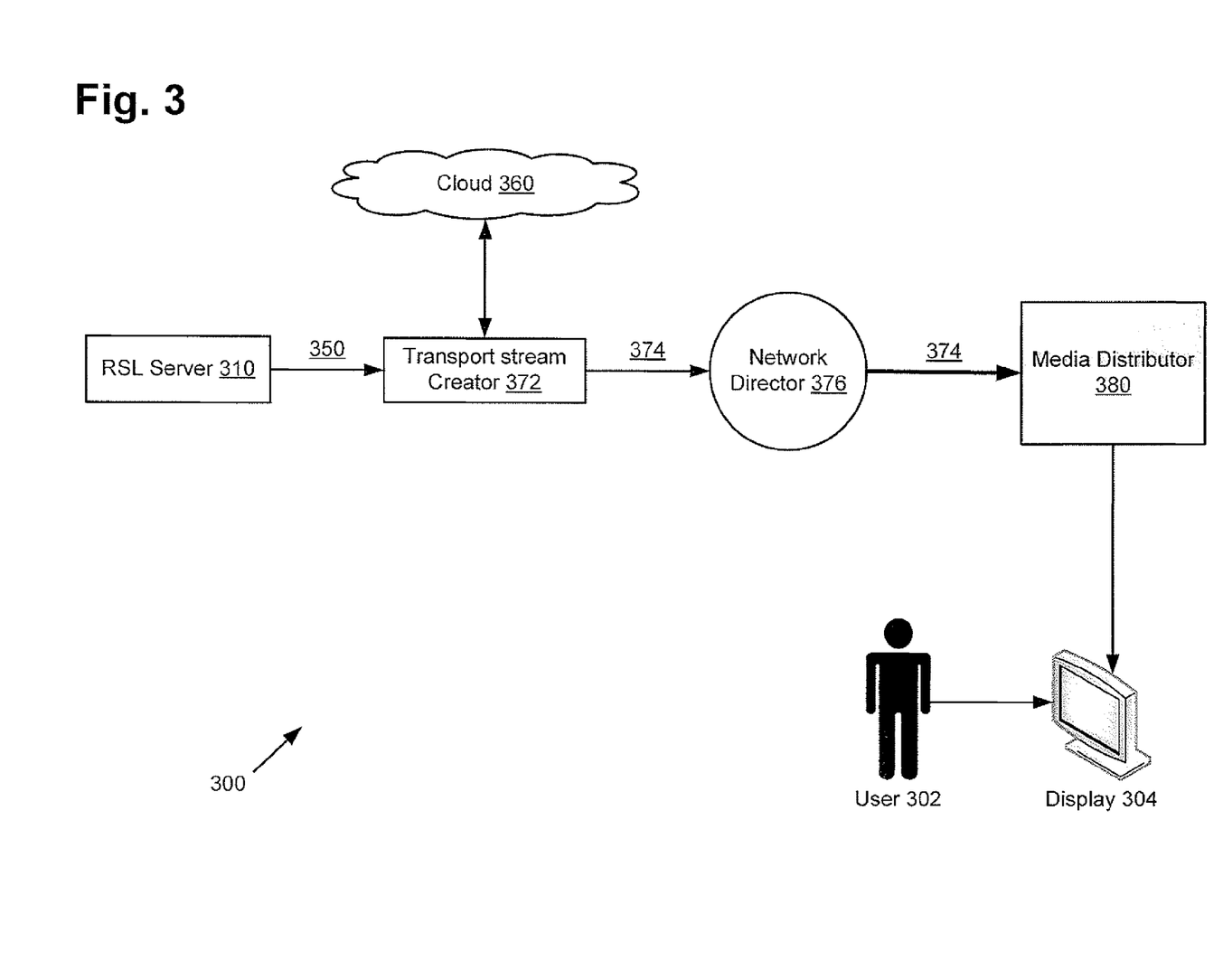
FIG. 3 shows an exemplary system environment showing creation of a recipient specific list and ensuing generation and distribution of an encoded content transport stream.

Moving to FIG. 3, FIG. 3 shows an exemplary system environment showing creation of a recipient specific list and ensuing generation and distribution of an encoded content transport stream. System environment 300 shows RSL server 310 transmitting RSL 350 to transport stream creator 372. Using RSL 350 and content cloud 360, transport stream creator 372 creates encoded content transport stream 374. Network director 376 receives encoded content transport stream 374 and distributes encoded content transport stream 374 to media distributor 380. Media distributor 380 may correspond to an affiliate media distributor or a multichannel video programming distributor. Media distributor 380 may then distribute media content contained in encoded content transport stream 374 to user 302 through display 304.

System environment 300 illustrates a simplified system for generating and distributing an encoded content stream from RSL 350. Thus, alternative implementations may support one or multiple systems or servers for balancing and/or reduced latency. RSL server 310 may create RSL 350, for example by using unique identifiers containing media content identifying data, recipient identification data, and additional content metadata.

According to the implementation of FIG. 3, after an RSL generation application of RSL server 310 creates RSL 350, RSL server 310 may transmit RSL 350 to transport stream creator 372 for processing. Next, transport stream creator 372 may execute an RSL analyzer of transport stream creator 372 to determine at least one RSL processor engine to execute for processing RSL 350. Transport stream creator 372 including an RSL analyzer and at least one RSL processor engine may be a system connected to RSL server 310 or may be application executed by RSL server 310. After, transport stream creator 372 executes at least one RSL processor engine, the at least one RSL processor engine may create an encoded content transport stream 374 using RSL 350 and content from content cloud 360. Thus, encoded content transport stream 374 may include media content, such as broadcast television programming, commercial programming, and interstitial programming, as well as additional identification data, such as recipient name, location, presentation data, and additional content metadata.

Encoded content transport stream 374 is then transmitted to network director 376. Network director 376 is used to distribute encoded content transport stream 376 media distributor 380. Network director 350 may receive information necessary to distribute encoded content transport stream 374 using network paths. Such information may come from data contained in the RSL 350, or sources such as live content encoding, health of distribution channels monitoring, monitoring and control or other sources. Network paths may correspond to communication channels used for distribution of media content, such as radio, satellite, fiber optic, or other communication channels.

Once an encoded content transport stream arrives at media distributor 380, media distributor 380 may act as a distribution point and distribute content contained in encoded content transport stream 374 to consumers. If a plurality of encoded content transport streams arrive at media distributor 380, media distributor 380 may determine which encoded content transport stream to give priority based on identification data and/or metadata contained in each encoded content transport stream and/or live content encoding. For example, if encoded content transport stream 374 contains priority data, media distributor 380 may give priority in decoding encoded content transport stream 374 into video content and/or audio content for distribution to display 304. Thus, media distributor 380 may control priority and transmission of content, such as television programming, live content, or commercial advertising, based on identification data and/or metadata contained in encoded content transport stream 374. After arriving at display 304, user 302 may then view the media content.

Figure 4:
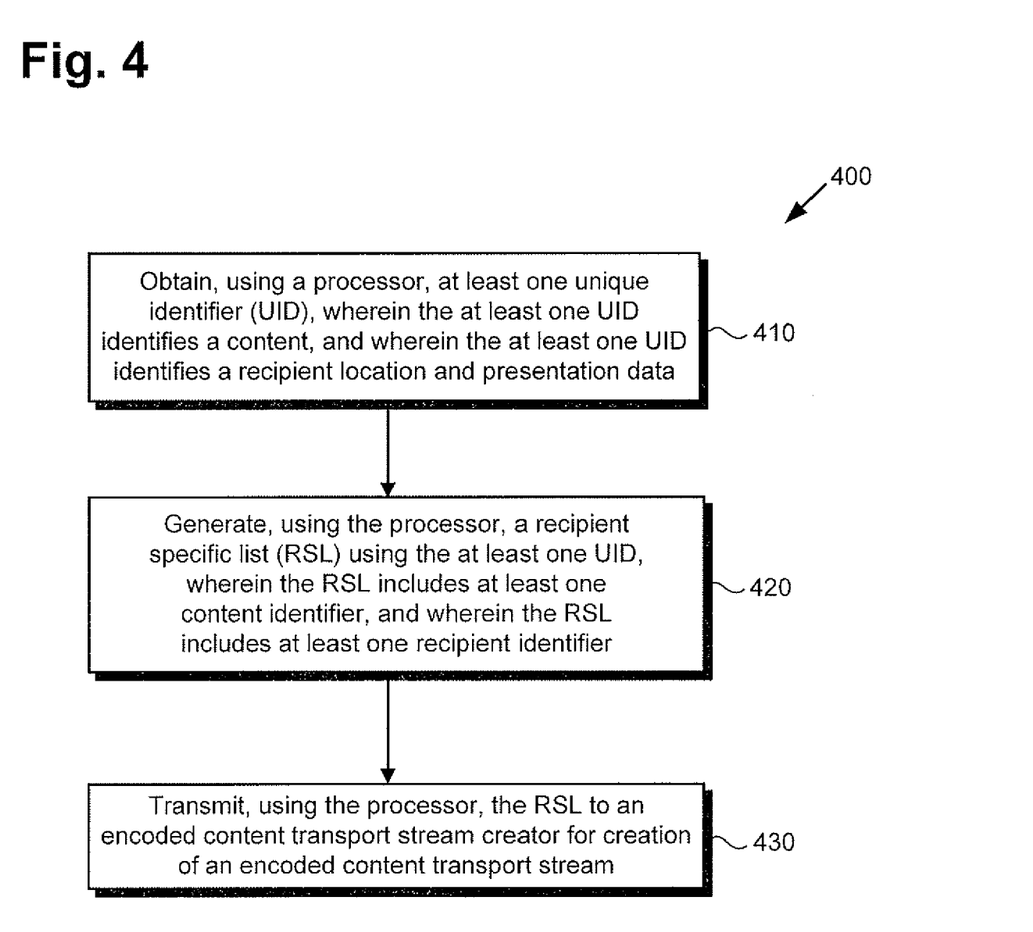
FIG. 4 presents an exemplary flowchart illustrating a method for generating a recipient specific list for distribution of media content.

FIG. 4 presents flowchart 400 illustrating a method for generating a recipient specific list for distribution of media content.

At operation 410, at least one unique identifier 130 (UID) is obtained, for example, by processor 112 of RSL server 110, wherein the at least one UID 130 identifies a content 1000/1002/1004/1006, and wherein the at least one UID identifies a recipient location 1100 and presentation data 1200. Unique identifiers 130 contain program schedules and clearances 132, commercial scheduling 134, and interstitial scheduling 136. Thus, unique identifiers 130 include data to uniquely identify content and a recipient location with presentation data for the content.

At operation 420, a recipient specific list 150/250/350 is generated using the at least one UID 130, for example, by processor 112 of RSL server 110, wherein the RSL 150/250/350 includes at least one content identifier 252, and wherein the RSL 150/250/350 includes at least one recipient identifier 254. RSL generation application 120 of RSL server may be executed by processor 114 to generate RSL 150/250/350 using data from unique identifiers 130. Once RSL 150/250/350 is generated, RSL 150/250/350 contains identification data including content identifiers 252 and recipient identifiers 254. Content identifiers 252 may uniquely identify content, such as program television ID 1000, commercial ID #1 1002, commercial ID #2 1004, interstitial ID 1006. Recipient identifiers 254 may uniquely identify a recipient name/location 1100 and presentation data 1200 including content scheduling 1202, presentation sequence 1204, and intended use 1206. RSL 150/250/350 may also include additional content metadata 256.

At operation 430, the RSL 150/250/350 is transmitting, for example, by processor 112 of RSL server 110, to a content transport stream creator 372 for creation of an encoded content transport stream 374. Encoded content transport stream creator 372 may be located on RSL server 110 or may be a networked processing unit. Once encoded content transport stream 374 is created, it may be transmitted to network director 376 to determine network paths for distribution of encoded content transport stream 374 to media distributor 380.

In this manner, a RSL may be generated and distributed according to programs schedules corresponding to affiliate endpoints. Therefore, media content may be distributed intelligently with less infrastructure and monitoring of the media content and distribution channels.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor for providing content distribution information to a video programming distributor, the method comprising:
   obtaining, using the processor, a unique identifier (UID), wherein the UID identifies a first entertainment content, a first recipient location, a first time schedule for the first entertainment content and first prioritization metadata for the first entertainment content;

generating, using the processor, a first recipient specific list (RSL) using the UID, wherein the first RSL includes an identifier for the first entertainment content, an identifier for the first recipient, the first time schedule for the first entertainment content and the first prioritization metadata for the first entertainment content; and transmitting, using the processor, the first RSL to a content transport stream creator for creation of a first encoded content transport stream using the first RSL and the first entertainment content, wherein the first prioritization metadata for the first entertainment content is used by the video programming distributor, which receives a second encoded content transport stream created using a second RSL including an identifier for a second entertainment content, an identifier for a second recipient, a second time schedule for the second entertainment content and second prioritization metadata for the second entertainment content, to determine whether to give decoding priority to the first encoded content stream over the second encoded content stream based on the first prioritization metadata for the first entertainment content embedded in the first encoded content transport stream and the second prioritization metadata for the second entertainment content embedded in the second encoded content transport stream.

2. The method of claim 1, wherein the identifier for the first recipient includes a broadcast affiliate television recipient.

3. The method of claim 1 further comprises obtaining, using the processor, additional content metadata.

4. The method of claim 3 further comprises generating, using the processor, the first RSL using the additional content metadata.

5. The method of claim 4, wherein the additional content metadata includes platform quality data, RSL identification data, content title data, V-Chip data, Nielsen data, and reconciliation keys.

6. The method of claim 1, wherein the first entertainment content includes at least one of television programs, movies, and music.

7. The method of claim 1, wherein the identifier for the first recipient comprises intended use information including data designating a category of use of the first entertainment content.

8. The method of claim 1, wherein the UID is specific to a geographic location corresponding to the identifier for the first recipient.

9. A system for providing content by a content provider to a video programming distributor, the system comprising:
a processor; and
a memory storing a computer software for execution by the processor;
wherein the processor is configured to execute the computer software to:
obtain a unique identifier (UID), wherein the UID identifies a first entertainment content, a first recipient location, a first time schedule for the first entertainment content and first prioritization metadata for the first entertainment content;
generate a first recipient specific list (RSL) using the UID, wherein the first RSL includes an identifier for the first entertainment content, an identifier for the first recipient, the first time schedule for the first entertainment content and the first prioritization metadata for the first entertainment content; and
transmit the first RSL to a content transport stream creator for creation of a first encoded content transport stream using the first RSL and the first entertainment content, wherein the first prioritization metadata is used by the video programming distributor, which receives a second encoded content transport stream created using a second RSL including an identifier for a second entertainment content, an identifier for a second recipient, a second time schedule for the second entertainment content and second prioritization metadata for the second entertainment content, to determine whether to give decoding priority to the first encoded content stream over the second encoded content stream based on the first prioritization metadata for the first entertainment content embedded in the first encoded content transport stream and the second prioritization metadata for the second entertainment content embedded in the second encoded content transport stream.

10. The system of claim 9, wherein the identifier for the first recipient includes a broadcast affiliate television recipient.

11. The system of claim 9, wherein the processor is further configured to obtain additional content metadata.

12. The system of claim 11, wherein the processor is further configured to generate the first RSL using the additional content metadata.

13. The system of claim 12, wherein the additional content metadata includes platform quality data, RSL identification data, content title data, rating data, and reconciliation keys.

14. The system of claim 9, wherein the first entertainment content includes at least one of television programs, movies, and music.

15. The method of claim 9, wherein the identifier for the first recipient comprises intended use information including data designating a category of use of the first entertainment content.

16. The system of claim 9, wherein the UID is specific to a geographic location corresponding to the identifier for the first recipient.

17. A computer readable software stored in a non-transitory memory for execution by a processor for providing content by a content provider to a video programming distributor, the computer readable software comprising:
code for obtaining a unique identifier (UID), wherein the UID identifies a first entertainment content, a first recipient location, a first time schedule for the first entertainment content and first prioritization metadata for the first entertainment content;
code for generating a first recipient specific list (RSL) using the UID, wherein the first RSL includes an identifier for the first entertainment content, an identifier for the first recipient, the first time schedule for the first entertainment content and the first prioritization metadata for the first entertainment content; and
code for transmitting the first RSL to a content transport stream creator for creation of a first encoded content transport stream using the first RSL and the first entertainment content, wherein the first prioritization metadata for the first entertainment content is used by the video programming distributor, which receives a second encoded content transport stream created using a second RSL including an identifier for a second entertainment content, an identifier for a second recipient, a second time schedule for the second entertainment content and second prioritization metadata for the second entertainment content, to determine whether to give decoding priority to the first encoded content stream over the second encoded content stream based on the first prioritization metadata for the first entertainment content embedded in the first encoded content transport stream and the second prioritization metadata for the second entertainment content embedded in the second encoded content transport stream.

18. The computer readable software of claim 17, wherein the UID is specific to a geographic location corresponding to the identifier for the first recipient.

\* \* \* \* \*

UNITED STATES PATENT AND TRADEMARK OFFICE
CERTIFICATE OF CORRECTION

| | |
|---|---|
| PATENT NO. | : 9,596,497 B2 |
| APPLICATION NO. | : 13/865354 |
| DATED | : March 14, 2017 |
| INVENTOR(S) | : Chiarulli et al. |

It is certified that error appears in the above-identified patent and that said Letters Patent is hereby corrected as shown below:

In the Claims

Column 8, Line 37, "method of claim 9" should be --system of claim 9--

Signed and Sealed this
Eighth Day of May, 2018

Andrei Iancu
*Director of the United States Patent and Trademark Office*